United States Patent
Allaire et al.

(10) Patent No.: US 6,518,497 B1
(45) Date of Patent: Feb. 11, 2003

(54) METHOD AND APPARATUS FOR BREAKING ICE ACCRETIONS ON AN AERIAL CABLE

(76) Inventors: Marc-André Allaire, 60 rue Valin, St-Fulgence, Quebec (CA), G0V 1S0; Jean-Louis LaForte, 246 rue Du Regent, Chicoutimi, Quebec (CA), G7G 2V7

(*) Notice: Subject to any disclaimer, the term of this patent is extended or adjusted under 35 U.S.C. 154(b) by 0 days.

(21) Appl. No.: 10/165,408

(22) Filed: Jun. 7, 2002

(51) Int. Cl.[7] .............................................. H02G 7/16
(52) U.S. Cl. ..................................... 174/40 R; 307/147
(58) Field of Search .......................... 174/40 R, 40 TD, 174/45 TD; 307/147

(56) References Cited

U.S. PATENT DOCUMENTS

| | | | |
|---|---|---|---|
| 4,085,338 A | 4/1978 | Genrikh et al. | 307/147 |
| 4,119,866 A | 10/1978 | Genrikh et al. | 307/147 |
| 4,135,221 A | 1/1979 | Genrikh et al. | 361/1 |
| 4,616,103 A | * 10/1986 | Balteau | 174/40 TD |
| 5,411,121 A | * 5/1995 | LaForte et al. | 174/40 R |
| 6,018,152 A | * 1/2000 | Allaire et al. | 307/147 |
| 6,207,939 B1 | 3/2001 | Allaire et al. | 219/600 |

FOREIGN PATENT DOCUMENTS

| | | | | |
|---|---|---|---|---|
| CA | 2281740 | | 3/2000 | H02G/7/16 |
| EP | 0377285 | * | 11/1990 | 174/40 R |
| JP | 401081613 A | * | 3/1989 | 174/40 R |
| JP | 401097125 A | * | 4/1989 | 174/40 R |
| JP | 402142314 A | * | 5/1990 | 174/40 R |
| JP | 404281317 A | * | 10/1992 | 174/40 R |
| JP | 494351415 A | * | 12/1992 | 174/40 R |
| JP | 406121438 A | * | 4/1994 | 174/40 R |

OTHER PUBLICATIONS

J.L. LaForte, M.A. Allaire, J. LaFlamme (1998) "State-of-the-Art on Power Line De-Icing"; Atmospheric Research, vol.46, pp. 143–158; (Dec. 1998).

Hansen, R. Fikke SM (2000) "De-Icing of Power Lines", Protura As, 21 p. (Dec. 2000).

* cited by examiner

*Primary Examiner*—Dean A. Reichard
*Assistant Examiner*—Adolfo Nino
(74) *Attorney, Agent, or Firm*—Ware, Fressola, Van Der Sluys & Adolphson LLP

(57) ABSTRACT

A method and an apparatus for de-icing aerial cables are provided. The cable is gripped and slowly twisted for a predetermined number of turns within the elastic domain of deformation of the cable. Mechanical elastic energy is therefore accumulated in the cable. The cable is then released and untwisted under the spring back effect, releasing the energy accumulated therein which breaks and shakes off the ice accumulated on the cable.

19 Claims, 9 Drawing Sheets

METHOD AND APPARATUS FOR BREAKING ICE ACCRETIONS ON AN AERIAL CABLE

FIELD OF THE INVENTION

The present invention relates to the field of aerial cables and more particularly concerns a method and apparatus for breaking and removing ice accretions formed on such cables.

BACKGROUND OF THE INVENTION

In cold regions, icing storms cause sleet, glaze, and rime to accumulate on exposed aerial cables and conductors. The weight of such ice deposits adds to the wind charge and increases the mechanical tensions in the cable, which may cause the cable to sag excessively or break. These problems occur with all types of cables, such as ground wires and conductors used on power and distribution line networks.

A few methods have been developed and used by electrical utility companies to counter and prevent the formation of ice on power line cables. A summary of such techniques can be found in Laforte, Allaire and Laflamme, "State-of-the-art on power line de-icing", *Atmospheric research*, vol. 46, pp 143–158 (1998). Conventional practices for avoiding or limiting ice formation generally consist of using Joule heating by injection of high, short-circuit currents, or mechanical shocks exerted on the ice accretions.

Methods using high, short-circuit currents consist of heating cables sufficiently to prevent heavy ice formation and cause adhering ice deposits to fall off. In the case of electrical conductors, the heating is done by injecting therein high intensity currents supplied by means of external transformers or normal transformers in special connections (see for example U.S. Pat. Nos. 4,085,338; 4,119,866; and 4,135,331, all to GENRICKH et al.). In the case of ground wires, which are non-energised, de-icing by Joule heating requires the use of an external power source supplying the high current needed. Such a practice has certain inherent disadvantages, one of them being the heavy current load required to raise the temperature sufficiently to cause the ice deposit to shed. Often, the capacity of the transmission system supplying the current is not sufficient to accomplish this task, and excessively large and expensive auxiliary transformers and rectifiers are required.

Mechanical methods include various miscellaneous devices, such as for example shown in Polhman and Landers, "Present state-of-the-art of transmission line icing", *IEEE Transactions on power Apparatus and Systems*, vol. PAS-101, no. 8, pp. 2443–2450 (1982). Most of them are generally used for ad-hoc de-icing operations, and need to be brought to the site after the icing events. The most common devices are various hand de-icing tools, which are used by linemen who access the iced cables by means of man-lifts or helicopters. Other methods, such as rollers (see Manitoba Hydro, "Atelier sur la gestion des tempêtes de verglas", Association Canadienne de l'Électricité (ACE), February 1993), mobile robots (see Montambault et al., "Preliminary Results on the Development of a Teleoperated compact Trolley for Live-in Working" *TransÉnergie*, 7p. 2000) and explosive devices (see Canadian patent application no. 2,281,740 (GAGNON)), which are under development, are remotely operated by people on the ground. However, they have to be installed on the iced cables prior to de-icing. All these ad-hoc de-icing operations have to be done according to very strict procedures to ensure public and worker safety. Electro-expulsive sheaths (U.S. Pat. No. 6,207,939 (ALLAIRE)), automated robots moving along cables (Montambault et al., "Preliminary Results on the Development of a Teleoperated compact Trolley for Live-in Working" *TransÉnergie*, 7p. 2000), and vibrating devices at the centre of the energised conductors (Hansen and Wahl, "De-icing of Power Lines" *Protura As*, 21p. 2000), are permanently installed. That is why they are subjected to long exposures, to severe environmental conditions between icing events, and require regular maintenance and refurbishment.

All mechanical devices and methods developed for de-icing conductors and ground wires of electrical lines have the inconvenience of being very expensive with regards to the man-hours required and the need to shut down the line during the de-icing operation, thus interrupting service to clients. Besides, most of the mechanical devices developed up to now, except for explosive and vibrating devices, involve an external force acting directly on the ice accretion, instead of acting on the cable itself. Explosive and vibrating devices on the other hand do apply mechanical forces directly onto the cable where they are placed. Explosive devices are fixed at one extremity of the cable and ice is removed by means of a few high intensity shock waves. Mechanical vibrators are installed at the centre of the cable which is being vibrated for de-icing. Both of these types of devices however have many disadvantages. The explosive devices require to be brought and installed at the level of aerial cables, which are de-iced after icing storms, span by span. They also require to be regularly reloaded with new explosive materials after a limited number of shocks. Moreover, repeated high intensity shocks may damage cable at their attachments. The removing of ice accretions on a span while other spans remain iced can produce unbalanced loads, damaging cable at their attachments. In the case of mechanical vibrators at cable centre, they require to be powered using electrical wires disposed along the cable from centre to its attachment. These electric wires are likely to be severely damaged by lighting strokes, especially for the application of de-icing aerial of ground cables of power lines. Moreover, the energy required for mechanical vibrator to keep cable free of ice is not yet known. Nevertheless, both de-icing techniques need a relatively high level of mechanical energy. Indeed, because of the high damping characteristics of strand cables, it is rather difficult to break ice accretions at a point 100 m and more distant from the generator by applying shocks or/and vibrations.

OBJECTS AND SUMMARY OF THE INVENTION

It is an object of the present invention to provide a practical and energy efficient method for de-icing cables.

It is also an object of the present invention to provide a practical and energy efficient apparatus for performing this function.

Accordingly, the present invention provides a method for breaking ice accretions formed on an aerial cable. The aerial cable has a longitudinal axis, a rigidly fixed first end and a second end opposed thereto. The method includes the steps of:

a) gripping a portion of the aerial cable proximate to the second end thereof;

b) rotating the portion of the aerial cable around the longitudinal axis to twist said aerial cable for a predetermined number of turns, thereby accumulating elastic energy therein; and c) releasing the portion of the aerial cable, thereby liberating the accumulated elastic energy therein, instantly untwisting said cable and breaking the ice accretions formed thereon.

Preferably, steps a) to c) are repeated a number of times sufficient to break and remove all or most of the ice accretions accumulated on the cable.

In accordance with another aspect of the present invention, there is also provided an apparatus for breaking ice accretions formed on an aerial cable. The aerial cable has a longitudinal axis, a rigidly fixed first end and a second end opposed thereto. The apparatus first includes a gripping means for gripping a portion of the aerial cable proximate to the second end thereof. Also provided is a motorised rotating assembly, engageable with the gripping means for rotating the portion of the aerial cable around the longitudinal axis to twist the aerial cable. The apparatus also includes a release mechanism for releasing the portion of the aerial cable. In this manner, the accumulated elastic energy therein is liberated, instantly untwisting the cable and breaking the ice accretions formed thereon.

Advantageously, the present invention preferably uses a twisting elastic force, applied evenly and simultaneously on the whole external surface of the cable, to break and remove all types of ice and snow accretions. It allows the de-icing of a cable with relative simplicity and a very low energy consumption, the de-icing system requiring only the automation of components already in use or in stock, and consuming in average less than 0.05 Watt per meter.

Other features and advantages of the present invention will be better understood upon reading of preferred embodiments thereof with reference to the appended drawings.

DESCRIPTION OF A PREFERRED EMBODIMENT OF THE INVENTION

Figure 1:
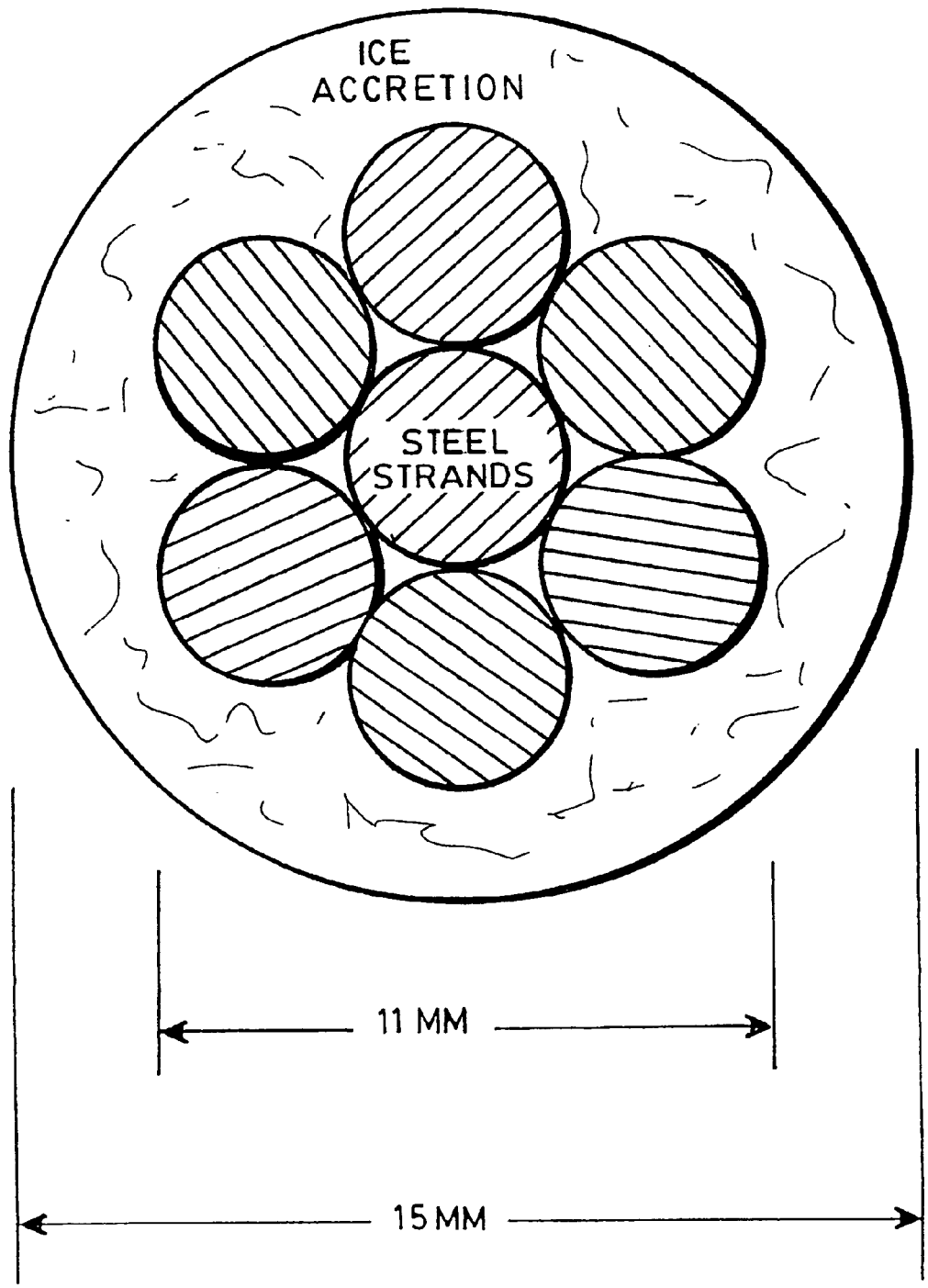
FIG. 1 is a cross sectional view of an aerial cable on which ice accretions have accumulated.

In accordance with a first aspect of the present invention, there is provided a method for breaking ice accretions on an aerial cable. Ice accretions are defined as any damageable deposits accumulating on aerial cables due to difficult weather conditions, particularly during ice storms. It is understood that the present invention may be applied to any type of cable which may be subjected to the accumulation of accretions thereon, and more particularly to low shear rigidity single stranded cables, such as small diameter tower guy-wires, electric line ground wires and energised conductors. The present invention may also be applied to smooth surface insulated low shear rigidity cables. Applications to single energised conductors however requires that the components of the apparatus of the present invention be kept at the same voltage as the line. The cable has a longitudinal axis and is firmly attached at one of its extremities.

The method according to the preferred embodiment of the invention first involves gripping a portion of the cable near its extremity opposed to the rigidly fixed one. When de-icing is needed, a rotation movement around the longitudinal axis of the cable is induced, to slowly twist the cable for a predetermined number of turns. De-icing can be achieved in two ways, by twisting the cable in the direction of the whorl of the outside stranding, in which the strands are compressed, slightly decreasing the external diameter of the cable, or in the opposite direction, in which outside strands are loosened, slightly increasing cable diameter. In either direction, the cable is preferably rotated slowly, for example at 1 to 10 rpm. The predetermined number of turns is preferably limited by the intrinsic elasticity of the cable, the deformation of which has to be kept within the elastic domain. Typically between 100 and 200 turns will be acceptable for single 200 m long stranded cables. At the end of the rotation, the aerial cable is released, and rapidly turns in the opposite direction due to the spring back effect. The elastic mechanical energy accumulated during the rotation is therefore liberated.

The capacity of de-icing by twisting a single cable covered by an ice deposit comes from the elastic deformation produced at the surface of the twisted cable, in combination with the small variations in cable diameter. On the basis of field observations made with 200 m long stranded steel cables 11 mm in diameter, the de-icing occurs during both low speed rotation and the fast release phase. During the low speed rotation, the small elastic deformation combined with the small variation in the cable diameter locally produces cracks at the ice/cable interface and within the ice deposit, thus causing a few pieces of ice to fall to the ground. Following the release, however, the fast turn back of the cable, due to the release of the accumulated elastic energy, breaks and shatters the ice deposit.

The effectiveness of de-icing by cable twisting mainly depends on temperature, and the type and shape of ice deposits. At lower temperatures, expected de-icing effectiveness is reduced. Moreover, low density accretions, such as soft rime, are much easier to remove than higher density glaze and hard rime deposits. Besides, eccentric or asymmetric deposits formed on cables with limited rotation offer a smaller iced surface than cylindrical accretions formed on rotating cables, and thus are much easier to remove. The amount of elastic energy to be accumulated by twisting for effective de-icing will vary depending on the prevailing conditions, but will always be limited by the intrinsic shear elasticity of the cable, to avoid damage. Advantageously, cycles of low speed rotation followed by a fast speed counter rotation can be repeated many times, until the cable is free of ice.

Figure 2:
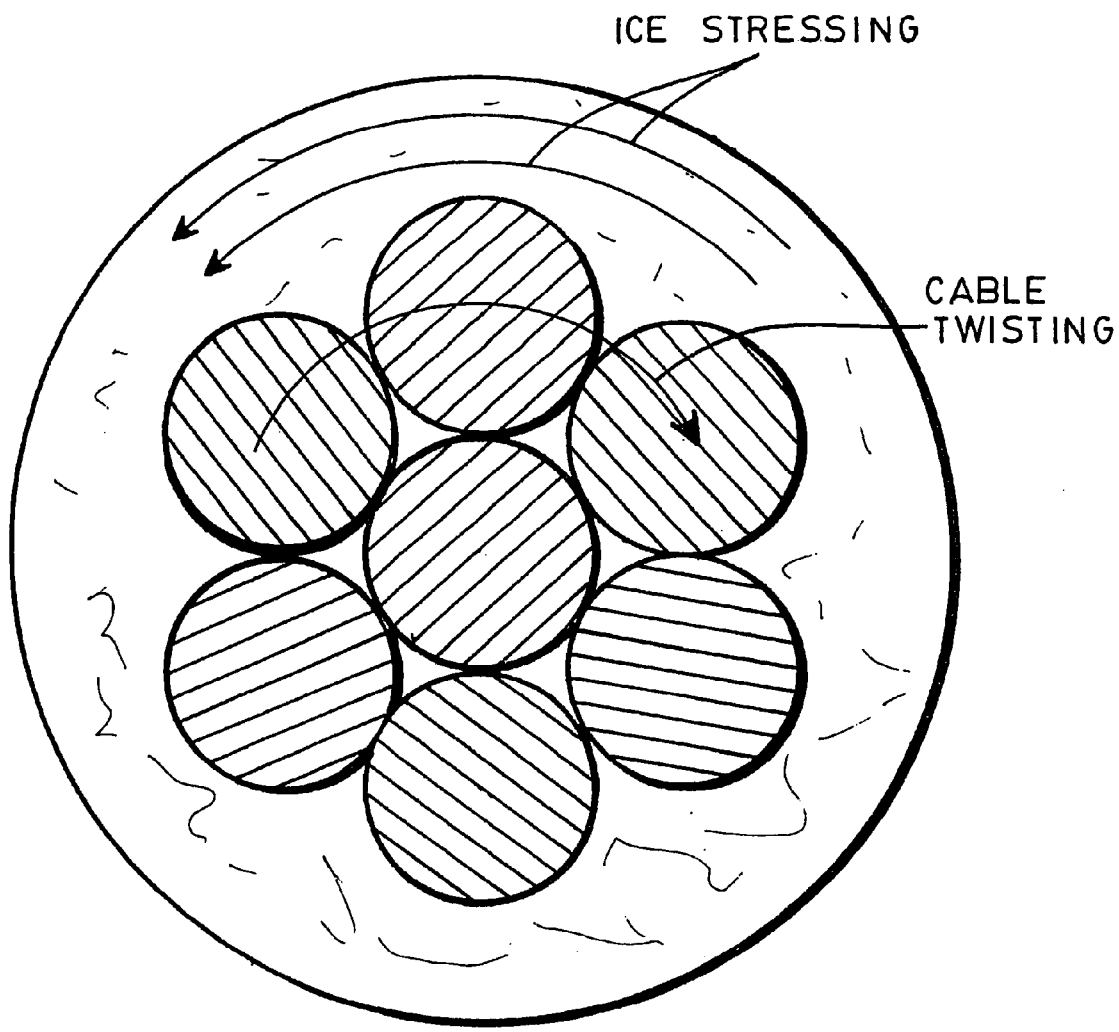
FIGS. 2, 3 and 4 show cross-sectional views of the cable of FIG. 1 at different stages of the twisting thereof in accordance with a preferred embodiment of the invention.
Figure 3:
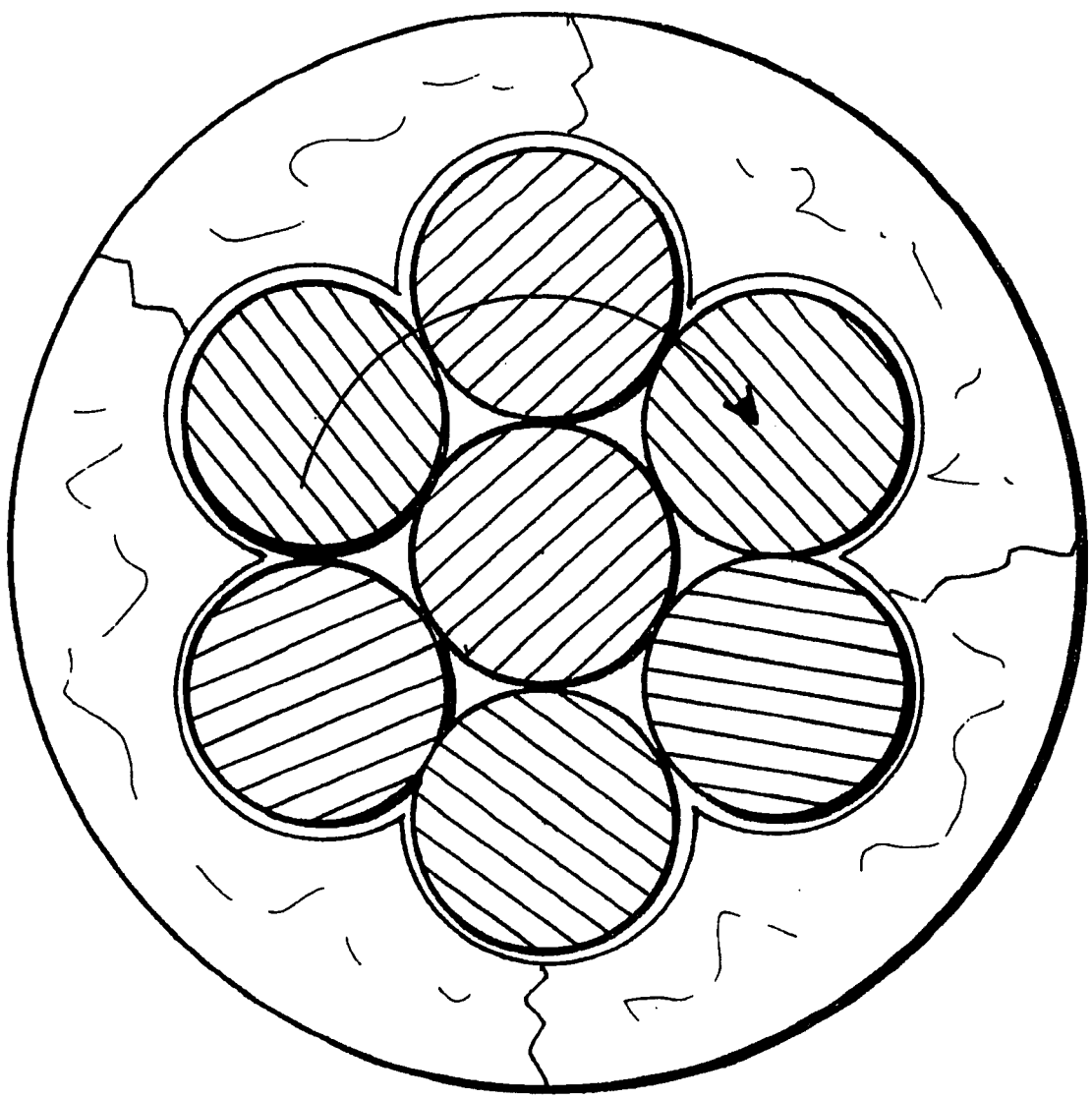
Figure 4:
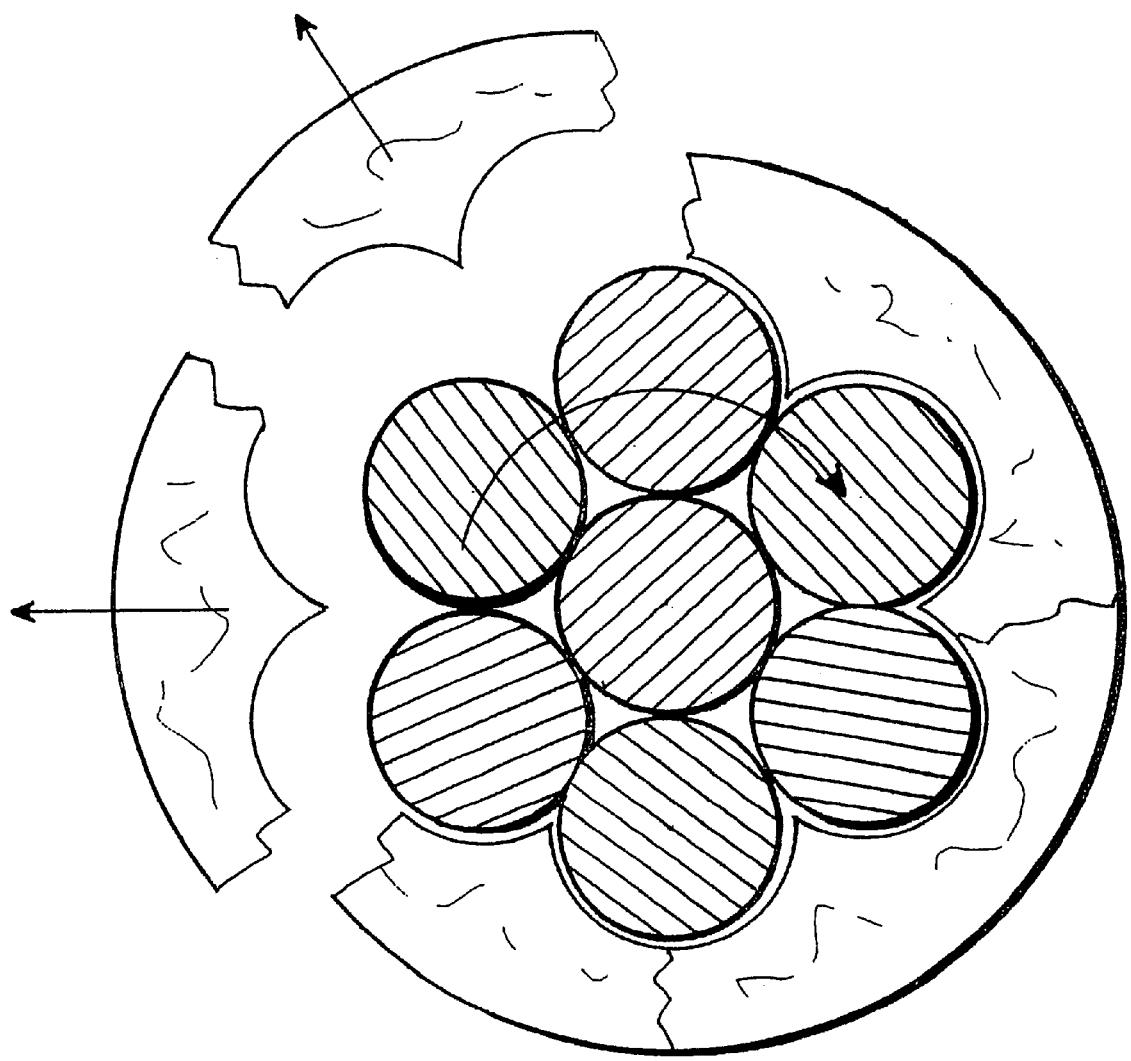
Figure 5:
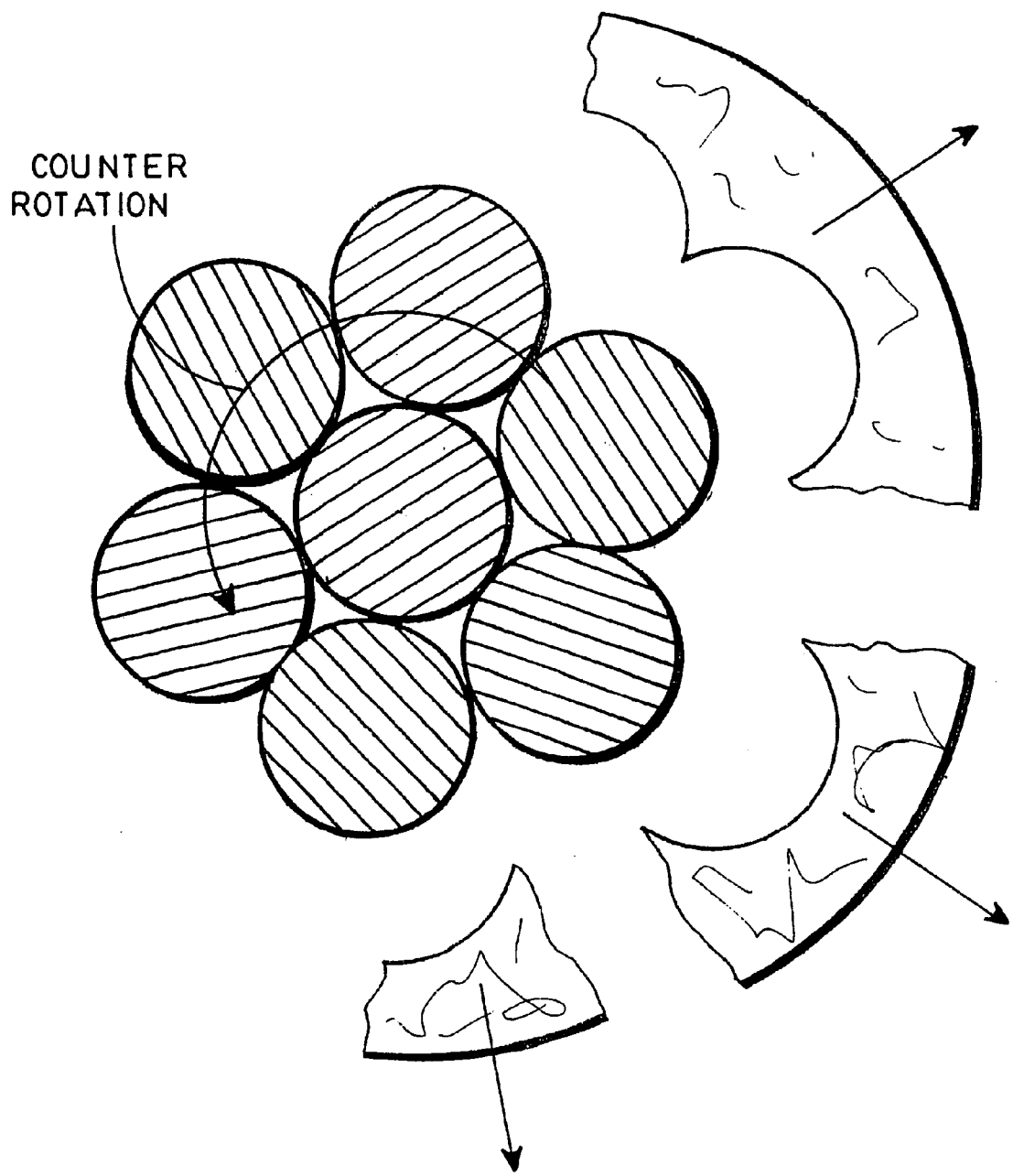
FIG. 5 is a cross-sectional view of the cable of FIG. 1 upon release thereof.

The method described above is illustrated in FIGS. 1 to 5, has been applied to an 11 mm stranded cable covered by a cylindrical ice accretion of 4 mm radial equivalent thickness. FIG. 1 depicts the iced cable before rotation. FIG. 2 illustrates the counter-stresses produced at the ice/cable interface and within the ice deposit in the beginning of the low rotation phase of the cable. When the stranded cable is twisted in the direction of the whorl of the outside stranding, the strands of the external layer are compressed and the external diameter of the cable slightly decreases. When the cable is twisted in the opposite direction, outside strands are loosened, slightly increasing cable diameter. In the case of stranded cables, the pitch of helical strands is changed by the twisting. As the number of turns increases and the elastic energy accumulates, ice strength being much lower than that of cable material, counter-stresses generated within the ice deposit locally initiate cracks, first at the ice interface, and then within the ice deposit itself, allowing the cable to locally shed some pieces of ice, as shown in FIGS. 3 and 4. Finally, FIG. 5 shows the condition prevailing after the release of the cable, where the accumulated elastic energy of the twisted cable is liberated very rapidly. As ice is very brittle at high rates of deformation, this contributes to crack and shatter ice deposits still in place.

Figure 6:
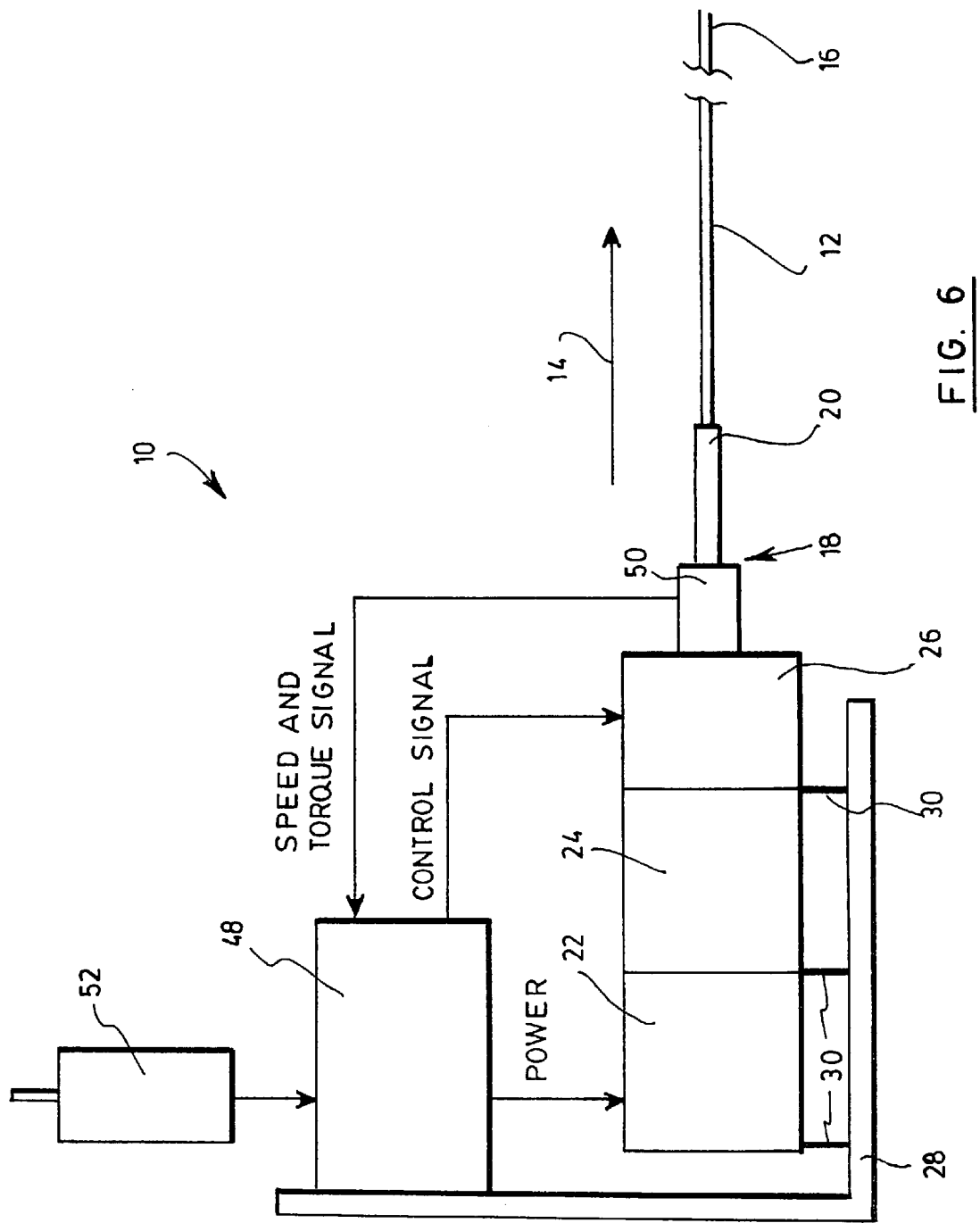
FIG. 6 is a schematic side view of an apparatus according to a first preferred embodiment of the invention.
Figure 7:
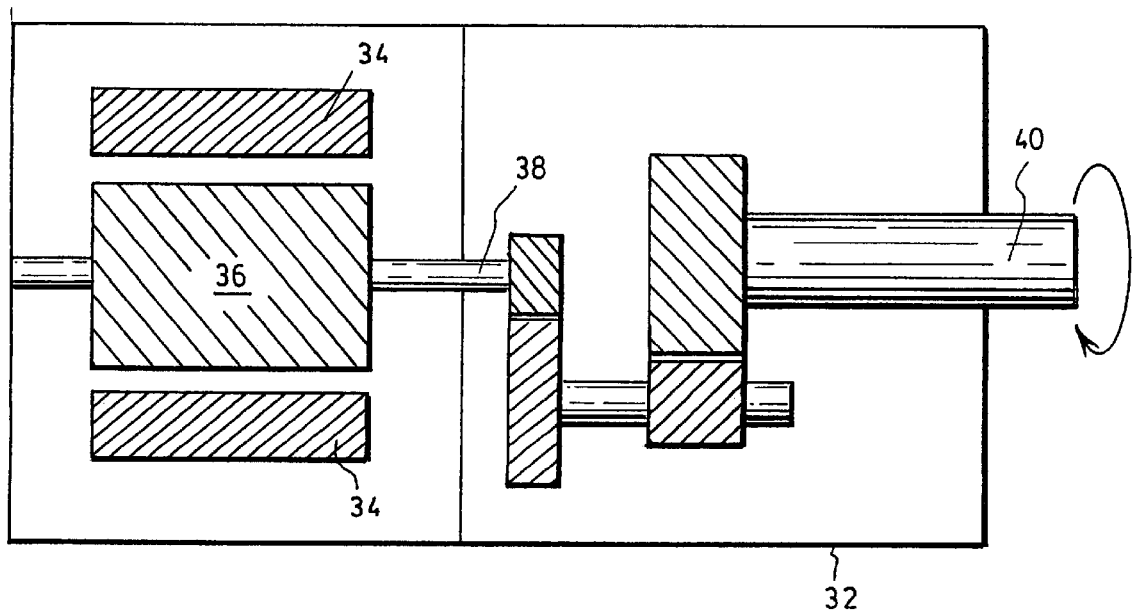
FIG. 7 is a schematic side view of a motorised rotating assembly for the apparatus of FIG. 6.
Figure 8:
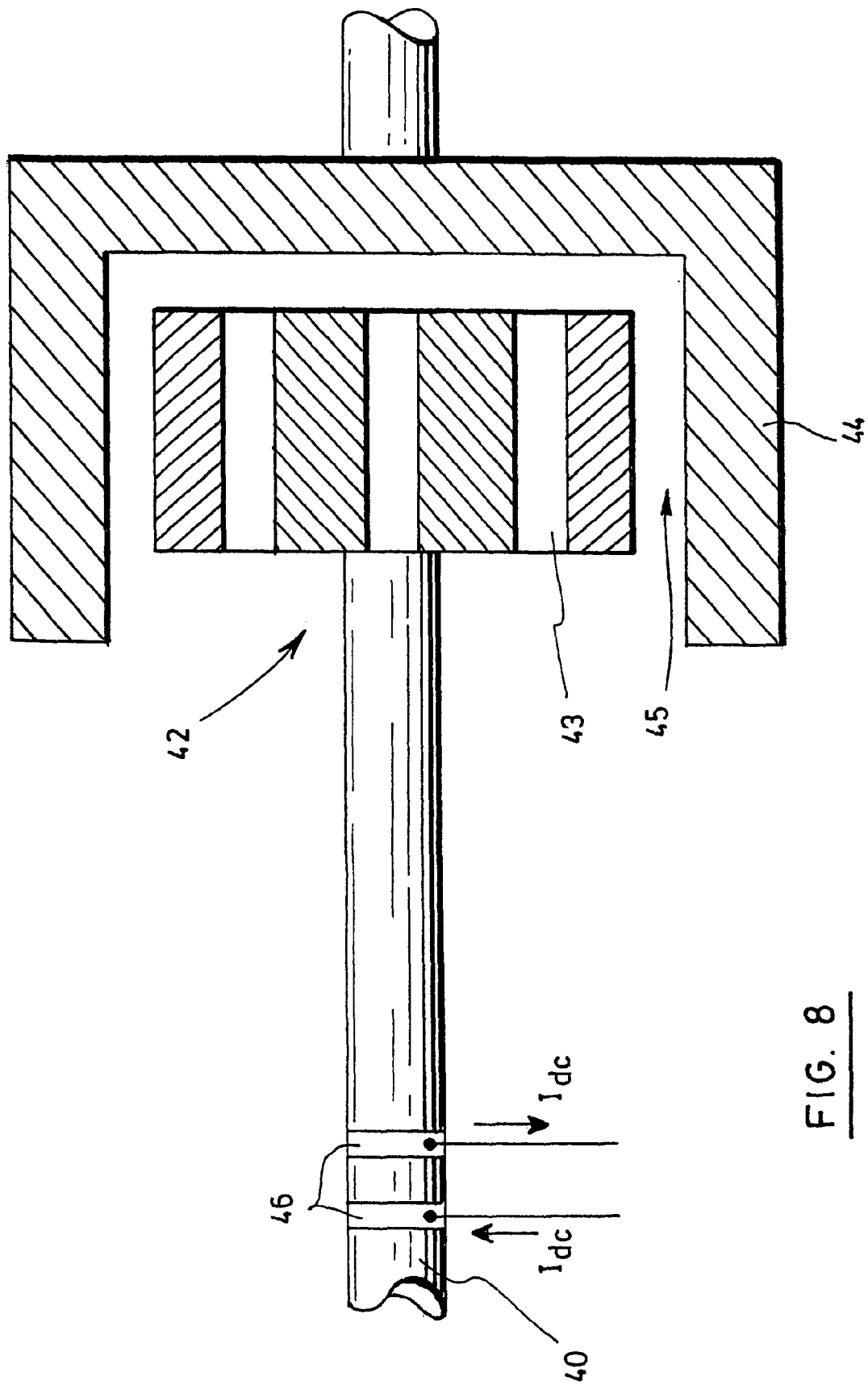
FIG. 8 is a schematic side view of a magnetic clutch for the apparatus of FIG. 6.

Referring to FIGS. 6 to 8, there is shown an apparatus 10 for breaking ice accretions on an aerial cable 12 according to a preferred embodiment of the present invention. The aerial cable has a longitudinal axis 14, a rigidly fixed first end 16 and a second end 18 opposed to the first end 16.

The apparatus 10 first includes gripping means for gripping a portion of the aerial cable 12 in the vicinity of its second end 18, preferably embodiment by a metallic sleeve 20 cold pressed on the cable 12. A motorised rotating assembly is engageable with the sleeve 20, and allows a rotation of the cable 12 around the longitudinal axis 14 to twist it for a predetermined number of turns. A release mechanism is also provided for releasing the portion of the aerial cable, thereby liberating the accumulated elastic energy therein, instantly untwisting the cable 12 and breaking the ice accretions formed thereon.

Preferably, the motorised rotating assembly includes an electrical motor 22, which produces the torque required for twisting the cable 12. The electric motor 22 may be supplied either in ac or dc. In the ac case, the motor 22 is preferably coupled to a gear train 24, itself coupled to a magnetic clutch 26, which reduces rotation speed in the required interval. The motor 22 and the gear train 24 and magnetic clutch 26, when provided, are firmly fixed to a rigid structure 28, for instance a pylon or tower attachment, by appropriate fasteners 30. With a high torque dc motor, it is possible to control the rates of either twisting or counter-twisting during the ice removal operation, without the need for a clutch.

Referring more particularly to FIG. 7, there is shown a preferred embodiment of the present invention where the components of the motorised rotating assembly are packed in a single unit 32 providing an extremely compact, efficient, packaged power drive. In this embodiment, the electric motor 22 is a standard 1,800 RPM ac motor and the sealed gear train 24 is correctly engineered for the load. As this assembly is mounted on a single base as a one-package, enclosed power drive, it is advantageously extremely compact.

In this embodiment, the electric motor 22 comprises a stator 34 and a rotor 36 driving the rotation of a motor shaft 38. The motor-shaft 38 drives the gear or series of gears of the gear train 24 in an oil bath, ultimately driving an output shaft 40 at the desired speed. This type of arrangement is a convenient way to obtain low speeds of approximately one RPM. Since the amount of power lost in gearing is very small, the drive has essentially constant horse power. In others words, as the output speed is low, the torque is high. With the example shown in FIG. 7, the torque of 1.5 lb-pi of a 1725:10 gear motor of ½ HP producing at 1725 RPM, will be 263 lb-pi at 10 RPM.

The output shaft 40 of the motorised rotating assembly is coupled to the magnetic clutch 26. Clutches provide smooth starts for operations in which the material being processed might be damaged by abrupt starts. When starting conditions are severe, a clutch inserted between the motor and the load means that the motor can run within its load capacity. In the present case, as automatic cycling is required, an electrically controlled clutch is preferably used. The magnetic drive couples the motor to the load magnetically. The magnetic drive can be used as a clutch and can be adapted to an adjustable speed drive. The magnetic (or eddy current) coupling is one of the more simple ways to obtain an adjustable output speed. There is no mechanical contact between the rotating members of the magnetic drive. Thus there is no wear. Torque is transmitted between the two rotating units by an electromagnetic reaction created by an energised coil winding. The slip between the motor and load can be controlled continuously with precision.

Referring now particularly to FIG. 8, the main components of the magnetic clutch 26 according to a preferred embodiment of the invention are shown. An electromagnet 42 is coaxially mounted on the output shaft 40, and has a coil winding 43 rotating within a steel conductive ring 44, an air gap 45 separating the two. The steel ring is rigidly fixed to the metallic sleeve 20 gripping the cable. In this embodiment, the output shaft of the motor extends along the same longitudinal axis as the cable 12, thereby transmitting its rotation thereto through the magnetic clutch 26. Slip rings 46 preferably surround the output shaft 40 to supply current to the electromagnet 42. In this manner, the magnetic flux crosses the air gap and penetrates the conductive ring 44. The rotation of the ring 44 with relation to the magnet 42 generates eddy current and a magnetic field in the ring 44. Magnetic interaction between the two units transmits torque from the motor 22 to the load. This torque is controlled automatically by adjusting the direct current supplied to the electromagnet 42 trough the slip rings 46. When the current is removed, the motor is mechanically and magnetically disconnected from the load. The magnetic clutch 26 thereby embodies, in this embodiment, the release mechanism allowing the release of the cable 12 after twisting.

Referring again to FIG. 6, the apparatus 10 preferably includes a control module 48 connected to the electric motor 22 and the magnetic clutch 26 for controlling the twisting of the cable 12. The control module 48 preferably houses the electronic circuits and a pre-programmed microprocessor required to feed and regulate the electric motor 22, and command the magnetic clutch 26. In the preferred embodiment, it controls all the operations of the twisting system: to start the electric motor 22 from the external signal; to stop the motor 22 after the predetermined number of turns is reached; to read in real time the counter torque imposed by the motor 22, measured by a torque sensor 50 provided on the second end 18 of the cable 12; to activate the magnetic clutch 26 to release the cable and thereby release the accumulated elastic energy at a pre-selected level of counter-torque; to restart the twisting cycle if the ice deposit is not completely removed, this in-time information being given by the torque sensor 50 from the mechanical tension measured in the cable.

The signal forwarded to the control module 48 to activate the system can be received from many sources: remote line monitoring, the torque sensor 50 measuring the mechanical tension of the iced cable 12, or an ice detector 52 provided in the vicinity of the cable. The torque sensor 50 may be embodiment by a tachometer generating a voltage that is proportional to its speed. Any change in load condition will change the speed. The resulting generator voltage fluctuations are fed to a control circuit which increases or decreases the magnetic drive field execution to regulate the speed. External communication with the control module is achieved via convenient electromagnetic waves. For energised conductors, where all components operate at line high voltage, the radio communication must be used for the autonomous and automated operation of the de-icing system. Radio communications with the microprocessor housed in the command module relay all the information required for the operation of the control module.

The apparatus 10 also preferably includes a power supply, here integrated to the control module 48, which may vary in construction according to application. In the case of non-energised single cables, the system can be powered by a regular ac source. When the latter is not available, as in remote areas, an external dc power supply of 12 or 24V with the required capacity can be used. It would also be possible to power the system installed on ground wires from the AC current induced by the nearby energised conductors. To achieve this, the ground wire has to be insulated and the current regulated using an appropriate device. In the case of energised single conductors, the power has to be supplied from the current line itself, by means of a current transformer installed on conductors with the required capacity. When used to de-ice energised cables, the whole system must however be kept at the same voltage as the conductor, without connection to the ground line.

The apparatus 10 may be used to pre-twist low shear rigidity cables during installation, so that they require higher torque to be twisted in service. Such cables would then behave as higher shear rigidity cables and accumulate eccentric deposits with much less rotation than the same cables used under normal conditions. The advantage of cable pre-stressing would be that of limiting the amount of ice that can accumulate on the cable, considering that a rotating cable accumulates a little more than a non-rotating one. The way of action of pre-stressing low rigidity cables would be comparable to the stress condition of pre-stressed concrete.

Figure 9:
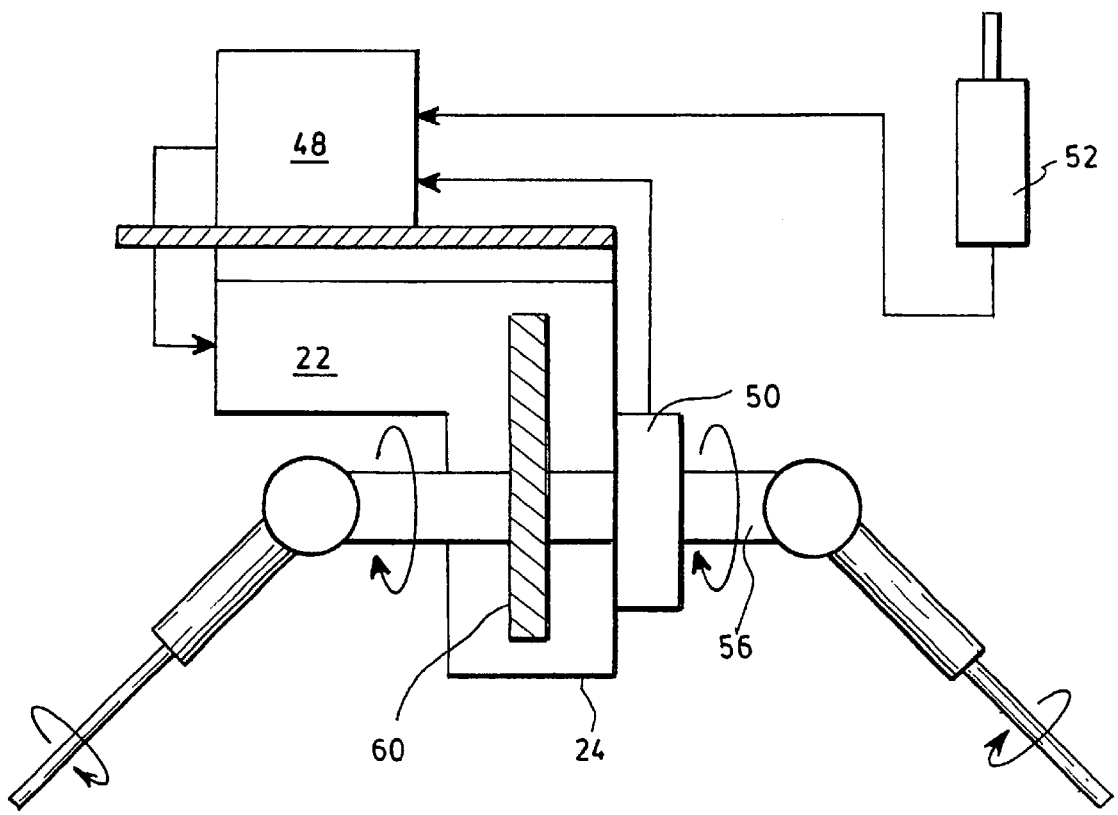
FIG. 9 is a schematic side view of an apparatus according to a second preferred embodiment of the invention.

Referring to FIG. 9, there is shown an apparatus 10 according to another embodiment of the present invention for use with a two cables installation. In this case, the rotational force is applied to the joint shaft 56 joining the two cables, transmitting the same rotational movement to both cables which are rigidly fixed at their extremities opposite the apparatus 10. In the illustrated embodiment, the last gear 60 of the gear train is rigidly fixed around the joint shaft 56, which is rotated by the motor 22. In this case no clutch is necessary and the operation of the motor 22 and gear train 24 manages the twisting and release of the cables 12a and 12b through the joint shaft 56.

EXAMPLE OF APPLICATION

In the following example, the method and apparatus of the present invention are applied to low rigidity single cables. That is the case of small diameter cables, such as guy-wires of towers or masts, and ground wires used on power and distribution lines. The following describes the calculations of the main design parameters of a motorised mechanism required to twist a steel stranded cable 11 mm in diameter and 200 m in length. This cable, composed of seven galvanised steel strands 3.7 mm in diameter, is commonly used as ground wire on power and distribution lines. Its measured tensile and shearing strengths are 80,000 and 40,000 N/m$^2$ respectively. That application sensibly corresponds to the 200 m ground wire span set-up where the first de-icing was experimented by cable twisting. As installed on the set-up, the cable at the centre of the span needs a Torque T of 1.6 Nm to rotate of one turn (2π radians), which corresponds to stiffness K, 0.25 Nm /radian. Using that information, it is possible to calculate the energy $E_{elastic}$ that can be accumulated when the cable is twisted in the elastic domain, using the relation:

$$E_{elastic} = \frac{T^2}{2K} = \frac{(K\theta)^2}{2K}, \quad (1)$$

where θ is equal to the product of 2πn, n being the number of turns applied to the cable.

It is assumed that the 200 m-long cable can be twisted for one hundred (100) turns and remain within the elastic domain. On the basis of results of torsion tests performed on 30 cm cable sections, a 2 m section of this cable remains within the elastic domain when twisted 1 turn, the maximum allowable number of turns being 2.8. Assuming then a value of 100 to the allowable number of turns, the elastic energy E accumulated in the cable twisted for 100 turns calculated using equation (1) will be:

$$\frac{K(2\pi n)^2}{2} = \frac{(0.25 Nm)(2\pi \cdot 100)^2}{2} = 49,000 \text{ Joules} \quad (2)$$

At this energy level, the counter torque to be applied to a twisted 200 m cable will be:

$$\sqrt{2KE} = (2 \cdot 0.25 \text{ Nm} \cdot 49000 \text{ J})^{1/2} = 160 \text{ Nm}. \quad (3)$$

The calculated value of 160 Nm can be used to determine the power P of the electrical motor required to twist the cable at such torque, through the relation P=Tω, the parameter ω being the speed of rotation expressed in turn per minutes. If a motor delivering 1 hp at 1,800 rpm, theoretically consuming 747 Watts, is used to drive the system, the maximum torque produced will be 3.9 Nm. Using a reduction gear box of 50:1, the rotation speed is reduced to 36 rpm and the torque applied rises to 195 Nm, thus exceeding the 160 Nm required for a rotation of 100 turns assumed previously for the 200 m cable. In that arrangement, the time required to twist the cable 100 turns will be 100 turns/(36 turns/min)= 2.8 minutes, which gives an idea of the duration of the low rotation phase. In practice, as the system is to be operated when ice thickness reaches 4 mm, considering a mean icing rate of 1 mm per hour, the system will function less 1% of the time (2.8 min/(4 h×60 min)=0.01, the energy consumption then averaging 7.5 Watts, rounded to 10 Watts. This gives 0.05 Watts/m for the power required to operate the 200 m long cable twisting de-icing system. This value is about 800 times lower than 40 Watts/m dissipated by the Joule heating methods. It appears thus very feasible to design and manufacture systems consuming in average under 40 Watts for de-icing a 400 m long single cable.

In summary, the present invention and its embodiments provides an autonomous system for ice removal to be applied to single aerial cables, eliminating or substantially reducing all of the disadvantages of existing techniques. The system consists of a controlled motorised rotating mechanism attached to a rigid structure, such as a pylon or tower, that twists in the elastic domain of deformation the iced cable, which is attached at the opposite extremity. The controlled rotating mechanism preferably comprises an electric motor fixed to a rigid attachment at the height of the cable, a reduction gear box, a magnetic clutch, a control module, and an ice detection unit. After or during an icing event, when the ice deposit reaches a target thickness, a signal is sent to the control module to start the electrical motor. Ice removal can be achieved in two ways, by twisting the stranded cable in the direction of the whorl of the outside stranding, in which the strands are compressed, slightly decreasing the external diameter of the cable, and in the opposite direction, in which outside strands are loosened, slightly increasing the external diameter of the cable. In the case of stranded cables, the pitch of helical strands is changed by the twisting. When twisted in either directions, the cable is slowly (1 to 10 rpm) rotated for many turns, the number of which is limited by the elasticity of the cable. Once the rotation phase completed, the magnetic clutch is opened, freeing the iced cable, which rapidly turns back due to the spring effect, thus releasing the elastic mechanical energy accumulated during the motor-driven rotation. During the low-speed rotation, the small elastic deformation produced at surface, contributes to locally crack and break the ice deposit, which causes some pieces of ice to fall to the ground. Following the magnetic clutch triggering, however, the fast movement of the cable at the surface, due to the spring back effect, breaks and expels the ice deposit. The cycle of a low speed rotation followed by a fast speed counter rotation can be repeated many times, until the cable is ice-free.

The proposed twisting de-icing system is very efficient, being activated only during ice storms, non-continuously, but at time intervals, when ice deposit thickness reaches 5 mm for instance. The system is very simple, requiring inexpensive off-the-shelf equipment, and does not need changes or modifications to existing cables. Because the deformation is below the elastic shear limit of the cable material, the twisting does not damage it by fatigue. In the case of single stranded cables, conductors, and ground wires, two spans can be de-iced with the same system, the cables located on each side of the common pylon being twisted by a single motorised mechanism. The system is automated, the de-icing being triggered remotely or using an ice detector or an ice load cable sensor located at the site. Also, the ice removal system does not require power interruption, service to customers being maintained during the whole de-icing operation.

Advantageously, the present invention is applicable for de-icing all types of single cables, tower guy-wires, electrical line ground wires and conductors. It is effective during and/or after ice storms for removal of all types of ice, rime, and sleet deposits, such as those formed under freezing rain, in-cloud icing, and wet snow. The application of the present invention is also effective to prevent galloping and damaging vibrations due to rime. It requires a low infrastructure and low maintenance, and uses inexpensive off-the-shelf pieces of equipment that can be installed on existing single cables with minor modifications to attachments. In addition, the present invention is environmentally safe, breaking ice deposits into small pieces, and it does not damage the cable, the latter being deformed well below the fatigue limit. In the preferred embodiment, the apparatus of the invention is automated, reducing the needs for manpower, the de-icing being triggered remotely, or using an ice detector or an ice load cable sensor located at the site. The average power required to operate the twisting de-icing system of the preferred embodiment is about 800 times lower than that of thermal processes. For example, the power supply needed for de-icing an 11 mm steel stranded cable 400 m in length will be lower than 40 watts.

In the particular case of power and distribution line applications, the present invention does not require that power be interrupted so that service to customers is maintained during the entire de-icing operation. Additionally, it can be powered directly by line current.

Of course, numerous modifications could be made to the embodiments above without departing from the scope of the invention as defined in the appended claims.

What is claimed is:

1. A method for breaking ice accretions formed on an aerial cable, said aerial cable having a longitudinal axis, a rigidly fixed first end and a second end opposed thereto, the method comprising the steps of:
    a) gripping a portion of the aerial cable proximate to the second end thereof;
    b) rotating the portion of the aerial cable around the longitudinal axis to twist said aerial cable for a predetermined number of turns, thereby accumulating elastic energy therein; and
    c) releasing the portion of the aerial cable, thereby liberating the accumulated elastic energy therein, instantly untwisting said cable and breaking the ice accretions formed thereon.

2. The method according to claim 1, comprising the additional step of repeating steps a) to c) until said aerial cable is free of ice accretions.

3. The method according to claim 1, wherein the predetermined number of turn step b) is between 100 and 200 turns.

4. The method according to claim 1, wherein steps a) to c) are remotely triggered.

5. The method according to claim 1, wherein the aerial cable has an elastic domain of deformation, the predetermined number of turns being selected to maintain the aerial cable within said elastic domain.

6. The method according to claim 1, wherein step b) comprises twisting said aerial cable at a rotation speed between 1 and 10 rpm.

7. The method according to claim 1, wherein the aerial cable has a plurality of strands forming a whorl, the rotating of step b) being done in a direction of said whorl.

8. The method according to claim 1, wherein the aerial cable has a plurality of strands forming a whorl, the rotating of step b) being done against a direction of said whorl.

9. An apparatus for breaking ice accretions formed on an aerial cable, said aerial cable having a longitudinal axis, a rigidly fixed first end and a second end opposed thereto, the apparatus comprising:
    gripping means for gripping a portion of the aerial cable proximate the second end thereof;
    a motorised rotating assembly engageable with said gripping means for rotating the portion of the aerial cable around the longitudinal axis to twist said aerial cable, thereby accumulating elastic energy therein; and
    a release mechanism for releasing the portion of the aerial cable, thereby liberating the accumulated elastic energy therein, instantly untwisting said cable and breaking the ice accretions formed thereon.

10. The apparatus according to claim 9, wherein the gripping means comprise a metallic sleeve cold pressed on the portion of the cable.

11. The apparatus according to claim 9, wherein the motorised rotating assembly comprises an electric motor having a rotatable motor shaft, said electric motor being mounted on a rigid structure proximate to the portion of the aerial cable.

12. The apparatus according to claim 11, wherein said motorised rotating assembly further comprises an output shaft and a gear train coupling said output shaft to the motor shaft.

13. The apparatus according to claim 12, wherein said output shaft extends along the longitudinal axis of the aerial cable proximate to the second end thereto.

14. The apparatus according to claim 13, wherein the release mechanism comprises a magnetic clutch coupled to the output shaft of the motorised rotating assembly.

15. The apparatus according to claim 14, wherein said magnetic clutch comprises:

an electromagnet coaxially mounted on the output shaft of the motorised rotating assembly;

a conducting ring extending around the electromagnet and being separated therefrom by an air gap, the conducting ring between rigidly fixed to the gripping means; and current supplying means for supplying current to the electromagnet.

16. The apparatus according to claim 14, further comprising a control unit connected to the electric motor and the magnetic clutch for controlling therethrough the twisting and untwisting of the aerial cable.

17. The apparatus according to claim 16, further comprising a power supply powering the electric motor, magnetic clutch and control unit.

18. The apparatus according to claim 16, further comprising a torque sensor coupled to the portion of the aerial cable for measuring a torque applied thereon by said motorised rotating assembly, the torque sensor being connected to the control unit.

19. The apparatus according to claim 16, further comprising an ice detector for detecting the ice accretions formed on said aerial cable, said ice detector being connected to the control unit.

* * * * *

UNITED STATES PATENT AND TRADEMARK OFFICE
CERTIFICATE OF CORRECTION

PATENT NO. : 6,518,497 B1
DATED : February 11, 2003
INVENTOR(S) : Allaire et al.

It is certified that error appears in the above-identified patent and that said Letters Patent is hereby corrected as shown below:

Column 7,
Line 65, "27" should be -- 2 --.

Column 8,
Line 7, "27" should be -- 2 --.
Line 29, "co" should be -- w --.

Signed and Sealed this

Twenty-eighth Day of October, 2003

JAMES E. ROGAN
*Director of the United States Patent and Trademark Office*